(12) United States Patent
MacLean

(10) Patent No.: US 6,745,428 B2
(45) Date of Patent: Jun. 8, 2004

(54) CLEANING BRUSH WITH DISPOSABLE BRUSH PORTION

(76) Inventor: Robert Kevin MacLean, 632 Wellington Street West, Toronto, Ontario (CA), M5V 1G4

( * ) Notice: Subject to any disclaimer, the term of this patent is extended or adjusted under 35 U.S.C. 154(b) by 46 days.

(21) Appl. No.: 10/108,855

(22) Filed: Mar. 29, 2002

(65) Prior Publication Data

US 2003/0135946 A1 Jul. 24, 2003

Related U.S. Application Data

(60) Provisional application No. 60/281,851, filed on Apr. 6, 2001.

(51) Int. Cl.[7] .............................. A46B 7/04; A47L 13/12
(52) U.S. Cl. ........................................ 15/111; 15/176.4
(58) Field of Search ...................... 15/111, 176.1–176.6, 15/194, 202

(56) References Cited

U.S. PATENT DOCUMENTS

| 993,617 A | * | 5/1911 | Pokorney | .................... 15/176.5 |
|---|---|---|---|---|
| 1,396,630 A | * | 11/1921 | Higbee | ....................... 15/176.4 |
| 3,167,799 A | * | 2/1965 | McKinley | ................... 15/176.4 |
| 4,610,043 A | * | 9/1986 | Vezjak | .......................... 15/111 |
| 4,890,349 A | * | 1/1990 | Nitzsche | ................. 15/176.5 X |
| 5,555,590 A | * | 9/1996 | Blum et al. | ............. 15/176.4 X |
| 5,864,915 A | * | 2/1999 | Ra | ......................... 15/176.4 X |
| 6,301,740 B1 | * | 10/2001 | Quiroz | ................... 15/176.1 X |

* cited by examiner

Primary Examiner—Mary Spisich

(57) ABSTRACT

This invention relates a cleaning brush of the type used for cleaning cooking grills. The cleaning brush comprises a handle member with a brush portion mountable to and dismountable from the handle member. The brush portion has a mountable frame member and brush bristles extending from the mountable frame member wherein the mountable frame member has an upper contact surface, outer side contact surfaces, and a locating securement member. The handle member has a head portion with a lower contact surface for contact with the upper contact surface of the mountable frame member when the brush portion is mounted to the handle member. The head portion has an opening to receive the locating securement member for locking movement of the brush portion in the forward, rearward or lateral directions when the brush portion is mounted to the handle member. There is provided a releaseable locking structure for locking the brush portion to the head portion of the handle member to securely fix the head portion and the brush portion in mounted relationship.

3 Claims, 5 Drawing Sheets

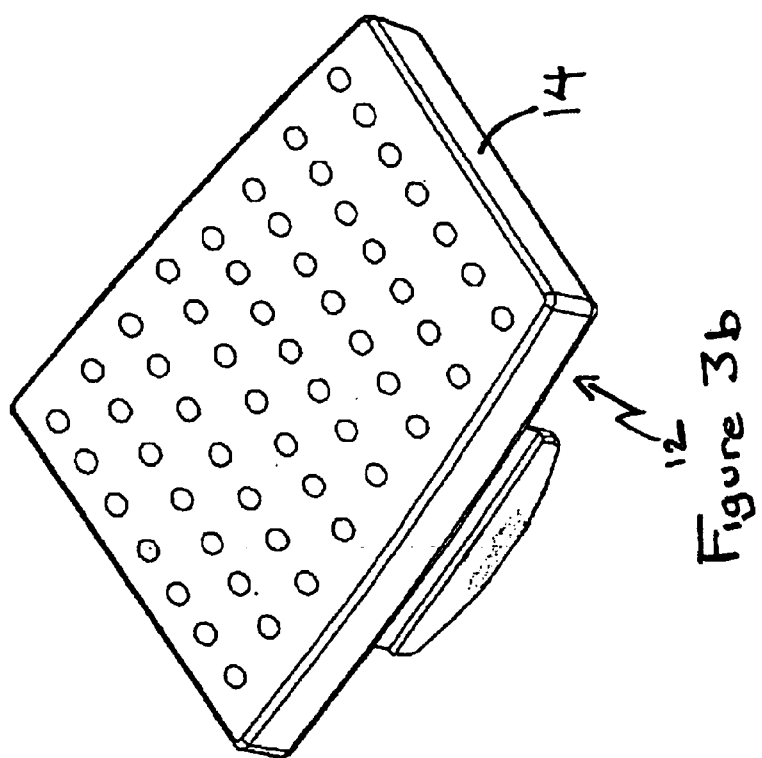
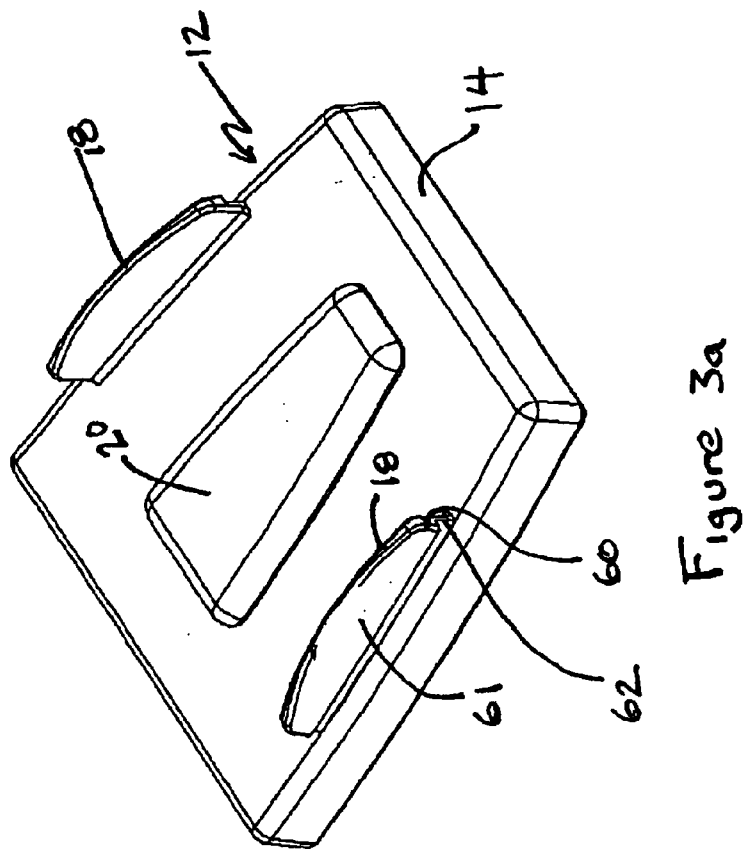

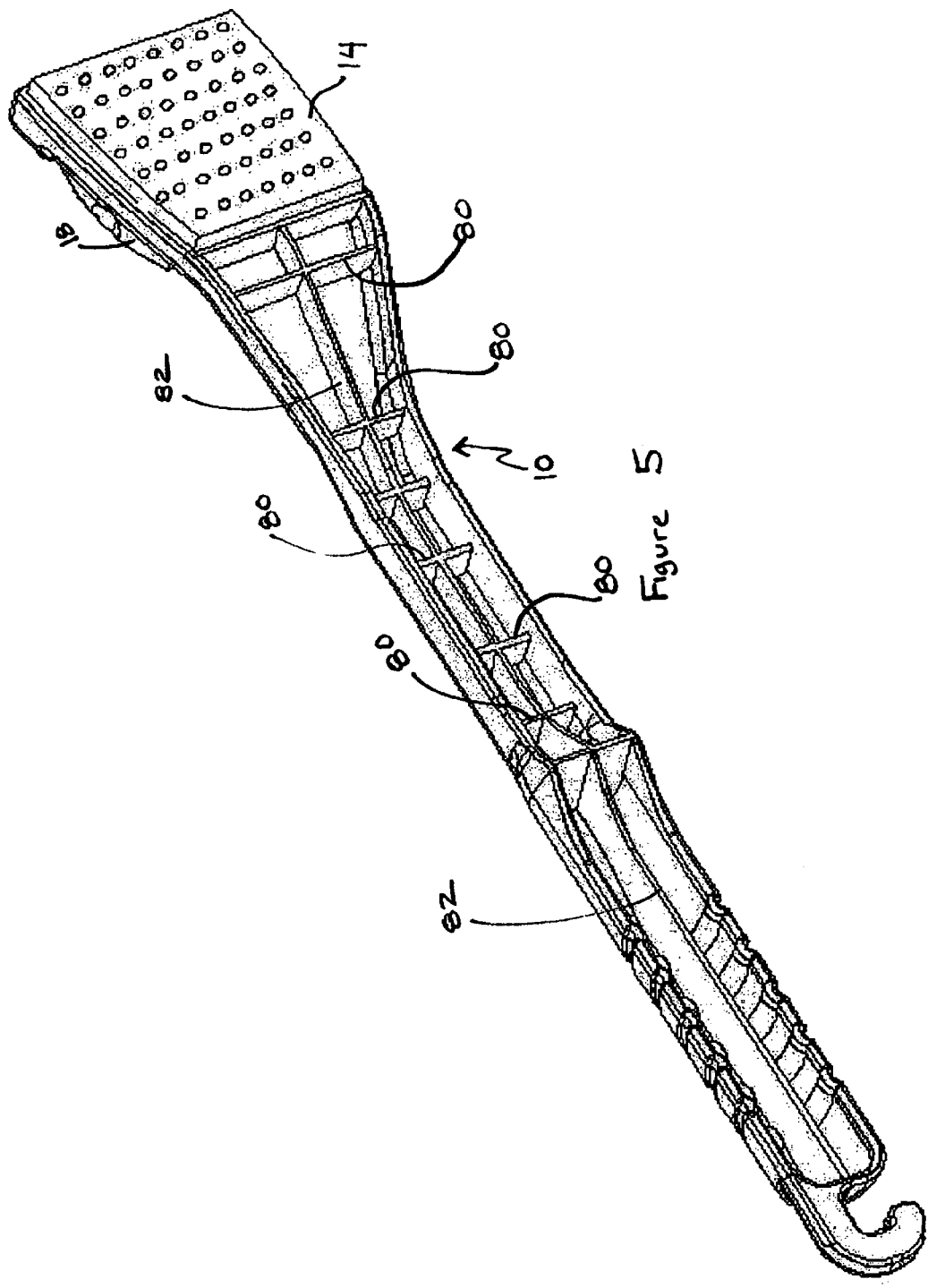

CLEANING BRUSH WITH DISPOSABLE BRUSH PORTION

CROSS REFERENCED TO RELATED APPLICATIONS

This application claims benefit under 35 U.S.C. 119(e) of the filing date of earlier filed Provisional Application Serial No. 60/281,851 filed Apr. 6, 2001 in the name of the same inventor.

This invention relates to a cleaning brush of the type used for cleaning cooking grills, such as those of barbeque cookers, after use.

BACKGROUND

Cleaning brushes are readily available for cleaning grills and other parts of barbeque cookers from hardware, grocery and convenience stores. Conventionally, they comprise a handle with a bristled brush end.

The problem with conventional brushes is that, after the brush portion becomes unusable by reason of accumulated grease or wear and tear, the whole brush, including the handle is generally thrown away and replaced. This is tremendous waste because it is usually the case that only the brush portion requires replacement.

It would be more economical and environmentally friendly if the bristled brush portion of the brush could be replaced on the handle. The ability to more readily replace the brush portion would also reduce the build-up of carcinogen residue on the brush and make the cooking process healthier by virtue of a cleaner brush being more often used.

An alternative proposal is taught in U.S. Pat. No. 6,216,306 for an invention entitled "Grill Cleaning Brush and Scraper". In that patent, there is taught a grill cleaning brush with a replaceable brush portion. The problem with this prior art brush is that the securement is attained by resilient clip connection between the replaceable brush portion and the handle portion which in the end provides the user with a less than stable connection than may be desired for the more difficult cleaning jobs. A stronger sturdier connection is desirable.

Other alternatives are taught in U.S. Pat. No. 6,049,935 for an invention entitled "Ansate Cleaning Implement with Removable Scrubber Element", which teaches a handle having a receiving base portion with a socket wherein there is a boundary wall defining the socket which completely surrounds the socket; and in U.S. Pat. No. 3,167,799 which teaches a handle for a brush having a base portion with a socket wherein the boundary wall defining the socket does not completely surround the socket. These brushes, however, fall short of achieving the securement desired by some users.

It is an object of the present invention to provide a cleaning brush for cleaning grills and other parts of cookers wherein there is a removable and replaceable cleaning brush portion, which can be securely mounted to handle portion for robust use by the user.

Other objects and achievements of the invention will be apparent to those skilled in the art upon reading the specification and claims included herein.

SUMMARY OF THE INVENTION

According to an aspect of the present invention, there is provided a cleaning brush of the type used for cleaning cooking grills, comprising: a handle member; a brush portion mountable to and dismountable from the handle member, the brush portion having a mountable frame member and brush bristles extending from the mountable frame member wherein the mountable frame member has an upper contact surface, outer side contact surfaces, and a locating securement member; the handle member having a head portion, said head portion having a lower contact surface for contact with the upper contact surface of the mountable frame member when the brush portion is mounted to the handle member; said head portion having an opening to receive the locating securement member for locking movement of the brush portion in the forward, rearward or lateral directions when the brush portion is mounted to the handle member; releaseable locking means for locking the brush portion to the head portion of the handle member to securely fix the head portion and the brush portion in mounted relationship.

In another aspect of the present invention, the head portion of the handle member is provided with inner side walls for contact with the outer side walls of the mountable frame member to secure the position of the mountable frame member with respect to the handle member.

BRIEF DESCRIPTION OF THE DRAWINGS

The invention will be more readily understood after reading the following description of the preferred embodiment of this invention given in the conjunction with the drawings in which:

FIGS. 3a and 3b are perspective views showing the brush portion from the top and bottom respectively, except that, for each of illustration, the brush portion is shown without bristles;

FIG. 5 is a perspective view showing the brush portion mounted to the handle portion from the bottom except that, for ease of illustration, the brush portion has been illustrated without bristles.

DESCRIPTION OF THE PREFERRED EMBODIMENTS

Figure 1:
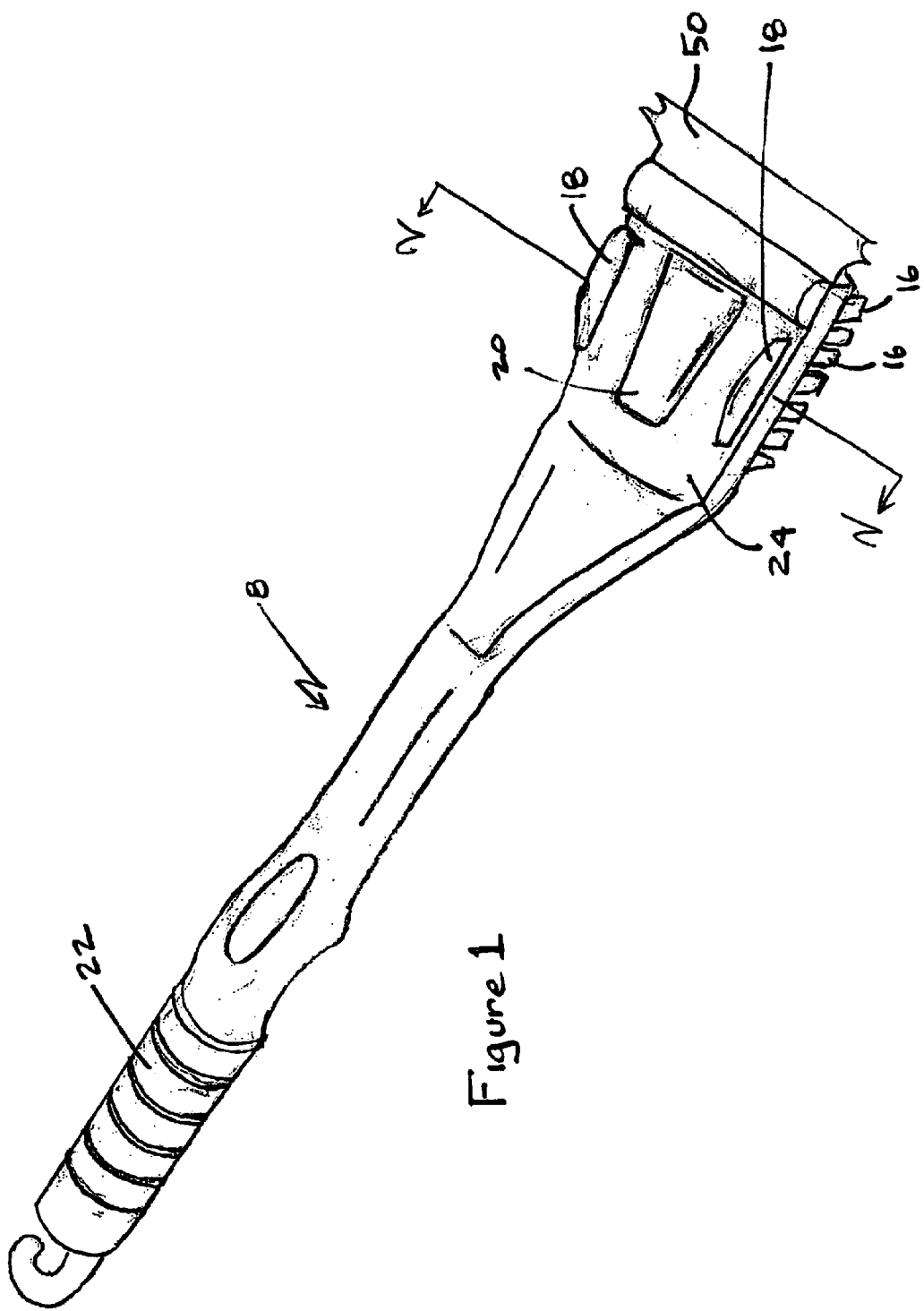
FIG. 1 is an illustration illustrating a perspective view of the preferred embodiment showing the brush portion mounted to the handle portion.

Referring to the drawings, there is shown a cleaning brush, generally referred to by the numeral 8, of the type used for cleaning cooking grills. The cleaning brush 8 comprises a handle member, generally referred to by the numeral 10, and a brush portion, generally referred to by the numeral 12.

Figure 2:
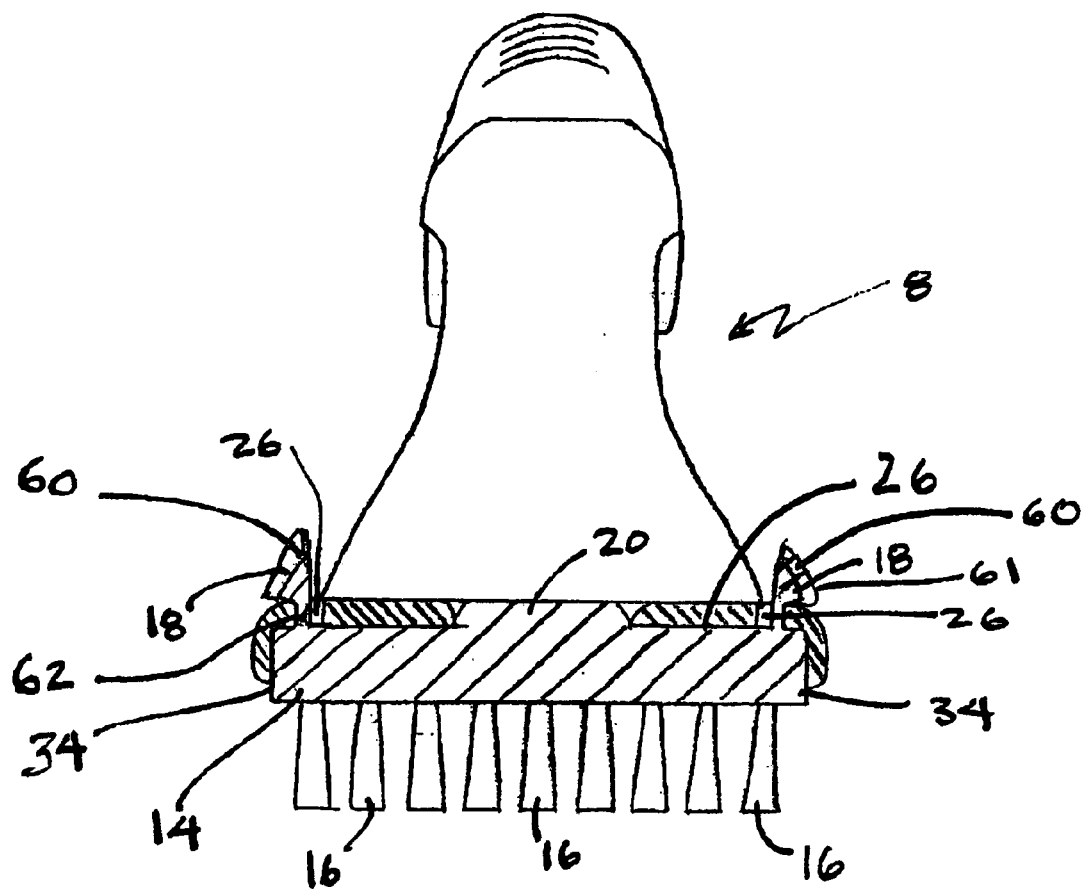
FIG. 2 is a cross-sectional view taken along lines 2—2 of FIG. 1.
Figure 4A:
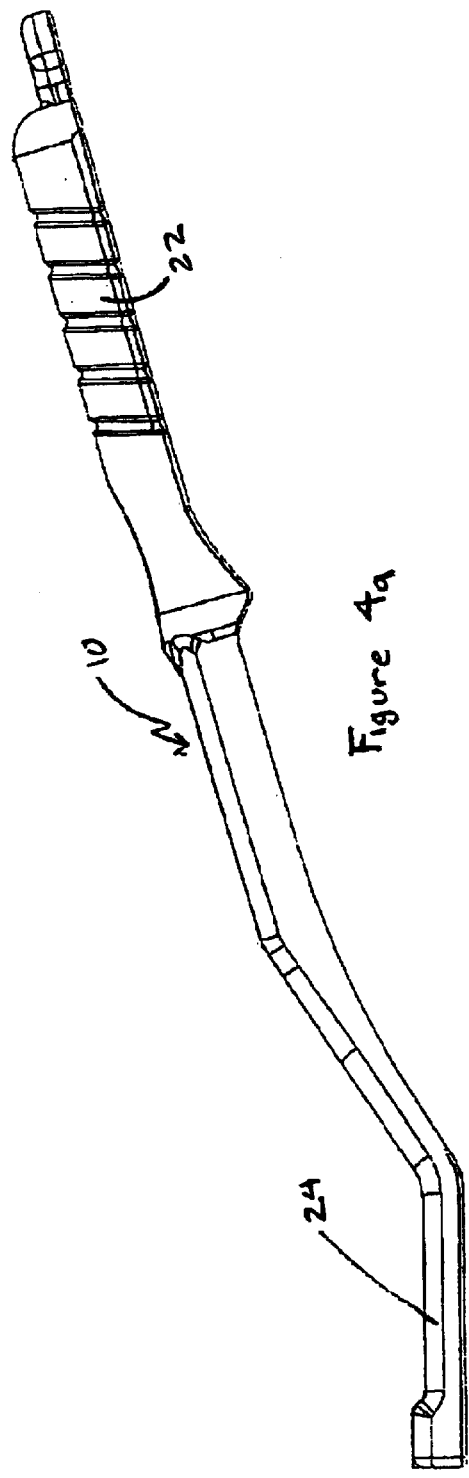
FIGS. 4a and 4b are perspective illustrations showing the handle member from the side and bottom respectively.
Figure 4B:
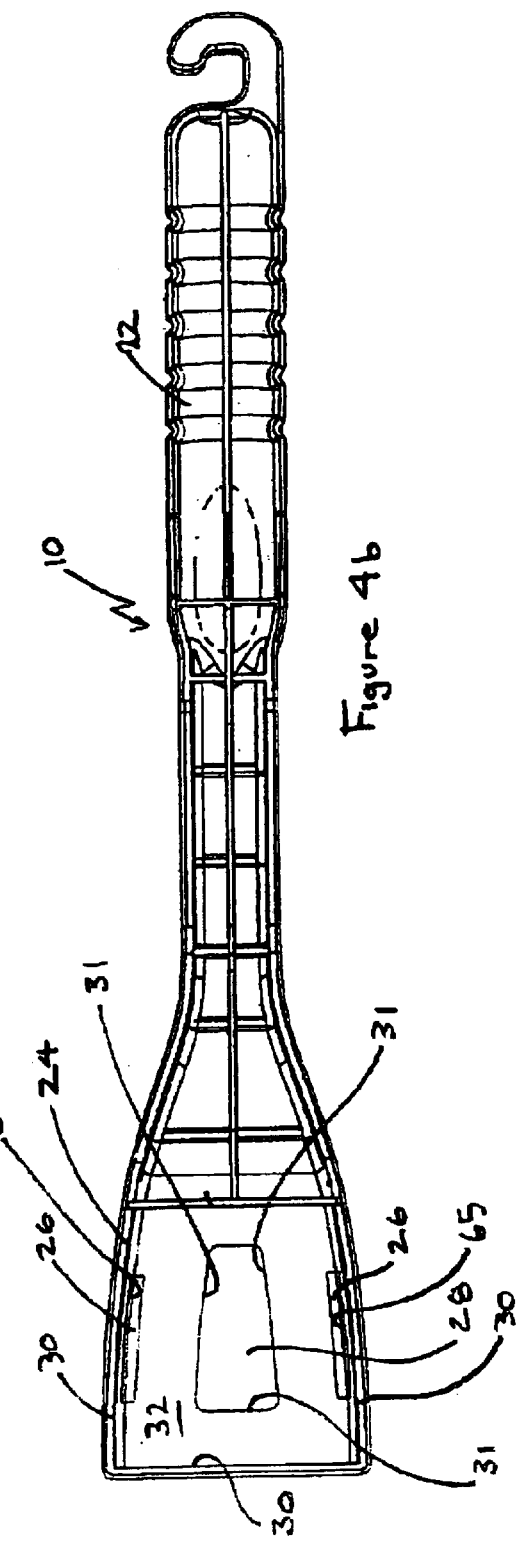

The brush portion 12 comprises a molded block body member 14, bundles 16 of bristles mounted therein, resiliently configured securement clips 18 and a locating securement member 20. The bristle bundles 16 have only been illustrated in FIGS. 1 and 2. They have not been shown in the other figures for ease of understanding only.

The handle member 10 includes a user-grip section 22 where the user can grip the cleaning brush 8 in use and a head portion 24. The head portion is formed with slot openings 26 for receiving the securement clips 18 and a central opening 28 for receiving the locating securement member 20 when the brush portion 12 is mounted to the handle member 10. When so mounted, the edge 31 of the central opening 28 prevents lateral jigging or movement of the brush portion 12 with respect to the handle member 10 in use.

In the preferred embodiment, as well, the head portion is formed with depending side walls 30 and a seating surface 32 so that when the brush portion 12 is mounted to the handle member 10, the side surfaces 34 and the uppers surface 26 of the body member 14 sit within and against the side walls 30 and seating surface of the brush portion 12, thereby preventing unwanted jiggling or movement of the brush portion 12 with respect to the handle member 10.

Optionally, as well, a scraping blade 50 may be securely mounted to the head portion 14 of the handle member 10 for added cleaning capability.

The clips provide a releaseable locking means for locking the brush portion to the head portion of the handle member to securely fix the head portion and the brush portion in mounted relationship to each other. The brush portion is mounted to the head portion by pressing the securement clips 18 through the openings 26. Each of the securement clips 18 includes a locking head 60 and an arm support 62. The locking head 60 has a sloped surface 61 so that in combination with the resilience of the arm support 62, the locking head slides against the edge 65 of opening 26 as the securement clip 18 is inserted through the opening 26. By virtue of the resilience of the clip's arm support 62, the original position of the arm support 62 can reassert itself and the clip locks the brush portion 12 to the head portion 24. However, the brush portion 12 can be easily removed by lateral bending of the securement clip 18 at its arm support 62 so that the locking head 60 is moved laterally to permit removal of the clip 18 through the opening 26.

In the preferred embodiment, the combination of the securement clips 18 and the seating of locating securement member 20 against the edge of the central opening 28 provide a secure mounting of the brush portion to the head portion. Furthermore, the seating of the side surfaces 34 and the upper surface 26 of the body member 14 against the side walls 30 adds further stability in the lateral, forward and reverse directions for the mounting.

The materials from which the various parts of the cleaning brush can be made will be apparent from the description provided above. The body member 14 of the head portion 24 can be made from a plastics material sufficiently strong to impart strength during brushing, but which provides resilient properties for the securement clips to facilitate mounting, dismounting and securement. In respect of the handle member, any suitably strong material may be used as would be required under the circumstances. The inventor has found that using a hard mouldable plastics material works well. The inventor has found it economical to make the handle member from a unitary mold with lateral and longitudinally extending support rib members 80, 82 provided within the handle member 10 to enhance the structural strength of the unit.

Other forms of securement, such as threaded screws, could also be used to secure the body member 14 to the handle member 10. However, threadable screws or securement means separately formed from the body member 14 are considered awkward. By providing the securement member 20 and separate opening 28, the inventor has found it preferable to use securement means such as the securement clips 18 which can be formed in the same molding process body member 14 as an extension thereto to provide a releaseable locking means which permits the mounting and dismounting of the body member 14 to the handle member 10.

In the present invention, the use a central opening 28 for receiving the locating securement member 20 greatly enhances the securement of the handle member 10 to the brush portion 12 in a manner not achieved prior to this invention.

The above description is of the preferred embodiment only and it is not intended that the description be read in a limited manner. Variations from the preferred embodiment without deviating from the scope of the invention will be apparent to those skilled in the art. The invention is as defined in the appended claims.

I claim:

1. A cleaning brush of the type used for cleaning cooking grills, comprising:

a handle member having a handle head, said handle head having a medial opening and peripheral openings, on either side of said medial opening;

a brush portion having a frame with resilient clips and a locating securement member extending from one face of said frame and brush bristles extending from an opposite face of said frame, each resilient clip having an enlarged clip head and a narrower neck;

said handle head and said brush portion configured such that said frame may be releasably clipped to said handle head by snap fitting said clips in said peripheral openings so that each clip head extends above an outside surface of said handle head so as to be reachable by a user for deflection to release said brush portion from said handle head;

said locating securement member of said frame, when said frame is clipped to said handle head, being received by said handle head medial opening such that the brush portion is locked against movement in the forward, rearward or lateral directions.

2. A cleaning brush of the type used for cleaning cooking grills as claimed in claim 1 wherein the handle member is a unitary unit made from a mold.

3. A cleaning brush of the type used for cleaning cooking grills as claimed in claim 1 further comprising a scraping blade extending from said handle head.

* * * * *